Dec. 2, 1952 M. W. BARDWELL Re. 23,589

PORTABLE POWER WRENCH

Original Filed Feb. 24, 1949 2 SHEETS—SHEET 1

INVENTOR
MARTIN W. BARDWELL

BY Walter H. Pumphrey
atty

Dec. 2, 1952 M. W. BARDWELL Re. 23,589

PORTABLE POWER WRENCH

Original Filed Feb. 24, 1949 2 SHEETS—SHEET 2

INVENTOR
MARTIN W. BARDWELL

BY Walter H. Pumphrey
Atty

Reissued Dec. 2, 1952

Re. 23,589

UNITED STATES PATENT OFFICE 23,589

PORTABLE POWER WRENCH

Martin W. Bardwell, Fayetteville, N. Y.

Original No. 2,578,279, dated December 11, 1951, Serial No. 78,089, February 24, 1949. Application for reissue March 4, 1952, Serial No. 274,738

5 Claims. (Cl. 81—57)

Matter enclosed in heavy brackets [ ] appears in the original patent but forms no part of this reissue specification; matter printed in italics indicates the additions made by reissue.

This invention relates to improvements in portable power-driven wrenches of the type disclosed in United States Patent No. 1,927,383, granted to me September 19, 1933.

The wrench of the patent consists in substance of a conventional form of worm gearing enclosed in a conveniently portable casing, from which an end of each of the shafts of the worm and the worm gear project for engaging connection respectively to a portable power unit, such as an electric motor, for driving the gearing and, through a suitable chuck, to the work element to be rotated by the wrench, the arrangement being such that the motor can be readily connected to or disconnected from the gearing and the wrench manipulated with equal facility with respect to the work. The motor has three points of support—a sliding connection with the wrench handle, a rigid connection with the gearing casing and the above described driving connection with the worm shaft. The wrench handle extends outward in one direction from the gear casing, above and in parallel relation to the motor shaft.

The object of the present invention is to improve the above described wrench construction in the following respects:

To overcome a tendency of the wrench handle to bend at or near the point of its attachment to the gearing casing, when the work offers excessive resistance and the motor is aided manually or the wrench is operated manually, independently of the motor, provision is made for reinforcing and reducing the strain on the handle, at the same time locking it against turning movement responsive to motor vibration, etc., tending to loosen the handle connection to the gearing casing.

To further resist torsional forces developed in the operation of the wrench, that tend to loosen the handle connection to the gear casing, the motor is rigidly clamped to the handle and as the latter is locked against turning movement, the resistance offered is sufficient to overcome such forces and there is no objectionable response to the same.

The above mentioned rigid connection between the handle and the motor, serves an additional important purpose in reducing the number of supports required for the motor to a single support, in addition to the driving connection, that is provided by the connecting clamp without the aid of other means.

To make available a rotational drive in either direction, such as is required for opening and closing valves and for other work, the ends of the [worm] *driven* gear shaft are extended beyond the gear casing and shaped for chuck coupling the work to be rotated, to either end of the shaft.

In the use of the wrench for heavy work, such as large subsurface valves, a record is frequently desirable for future reference, of the number of turns necessary to fully open and/or close the valves. To enable such a record to be made, a revolution counter is detachably coupled to either free end of the [worm] *driven* gear shaft, that is the end opposite that to which the work is connected and acts automatically to indicate on a dial the number of turns made by the shaft in either direction, in each opening and closing operation of the valves.

Other features of the invention not specially mentioned above, will be brought to attention in the detail description that follows:

The accompanying drawings illustrate the preferred embodiment of the several features of improvement herein referred to, but it will be understood that no limitations are intended by this showing other than are imposed by the appended claims.

Figure 1:
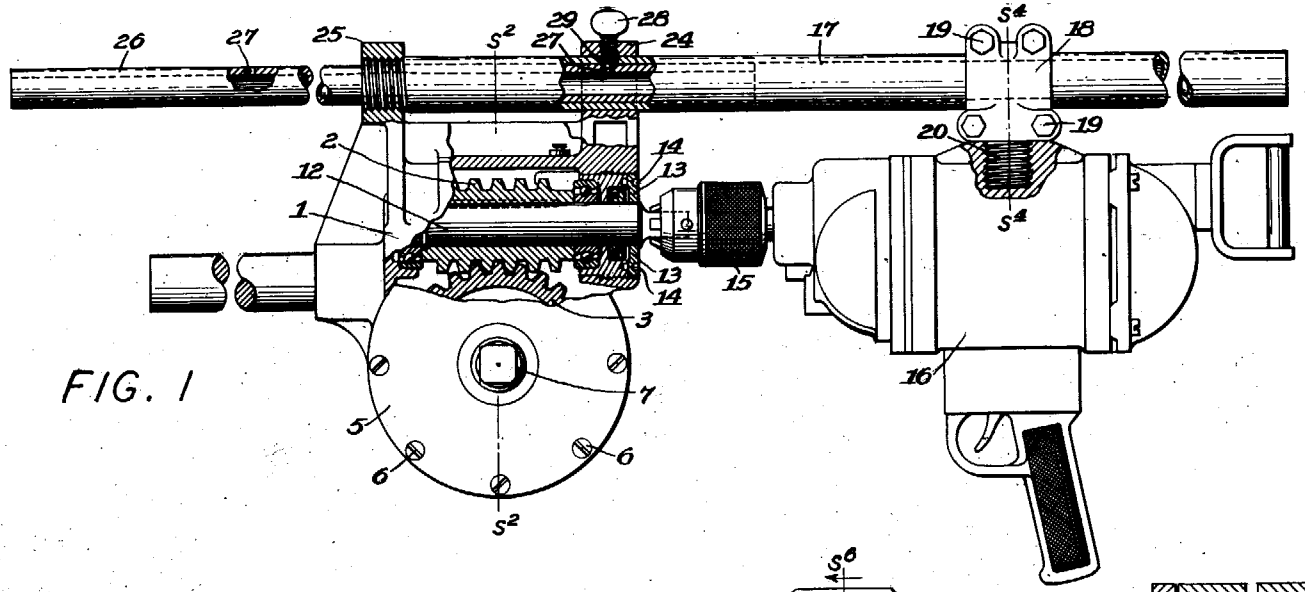
Fig. 1 is a view in side elevation, with parts broken away and others in section, showing my improved power wrench.

Referring to the drawings, 1 represents a casing [suitable] for housing *suitable gearing, preferably* a set of worm gearing comprising a worm 2 and worm gear 3. The main body of the casing is cylindrical in form to receive the worm gear and has an offset tubular portion in which the worm is mounted in meshing relation with the gear.

The open ends of the main body portion 4 of the casing are closed by twin cover plates 5, 5, which are exact duplicates of each other and are interchangeable for use at either end of the cylinder, the resulting advantages of which will be obvious. The plates are removably secured oil-tight to the casing by screw bolts 6.

The worm gear is carried by a shaft 7, which, for economical reasons and to simplify the construction, is formed integral with the gear. The shaft is journaled in annular bearings 8, of ball or roller type, held in annular seats 9, cast in part with the end cover plates.

Figure 2:
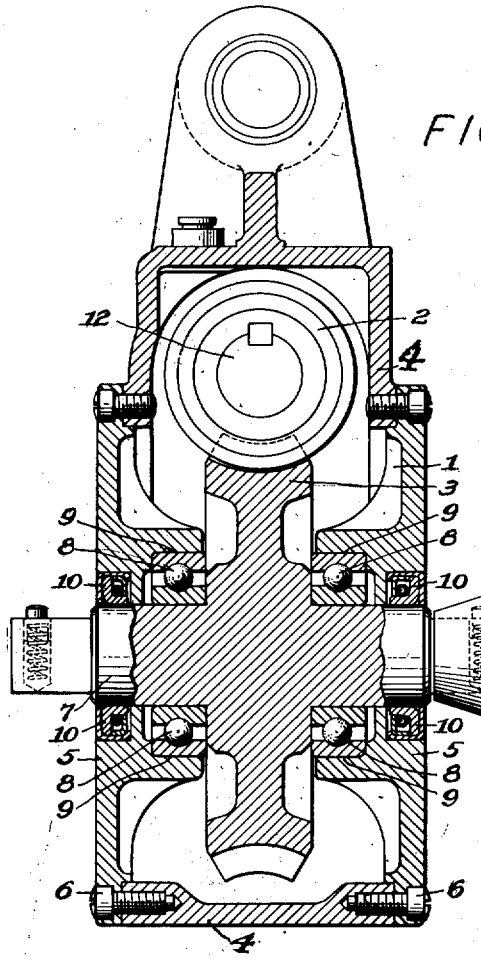
Fig. 2 is a cross sectional view, on the line $s^2$—$s^2$ of Fig. 1.

The ends of the shaft project through conventional oil seals 10, in and beyond the same, as shown in Fig. 2. The projecting ends of the shaft are squared or otherwise formed in cross section for a coupling connection at either end with a chuck 11, by means of which the worm gear shaft is connected with a tool or other work element to be rotated. It will be noted that in making both ends of the shaft available for chuck coupling, a rotatable drive is obtainable in either direction and avoids the necessity of employing reversing gearing or a reversible motor. This feature is particularly useful in opening and closing large subsurface valves of water and gas mains and the like.

The worm 2, preferably tubular, is carried by a shaft 12, to which it is keyed, splined or otherwise secured. The shaft is journaled in bearings of roller or ball type suitably proportioned to be slipped into the casing for use at either end of the tubular portion thereof and are held in place and adjusted inwardly by a threaded end plate 13. Holes or sockets 14 are provided in the outer face of the end plate for engagement by a spanner, for such rotational adjustment as may be required to bring the worm into proper relation with the teeth of the gear. The end plate is held as adjusted by a suitably placed set screw, not shown.

One end of the worm shaft projects through an oil-sealed central opening of the end plate 13 and is suitably shaped for engagement by a chuck 15, by which it is detachably coupled to the drive shaft of a portable motor 16, attached to the wrench handle.

An electric motor of conventional form is preferred but if electric power is not available, a compressed air or gasolene motor may be used or, in the absence of power, the wrench may be operated manually.

Figure 7:
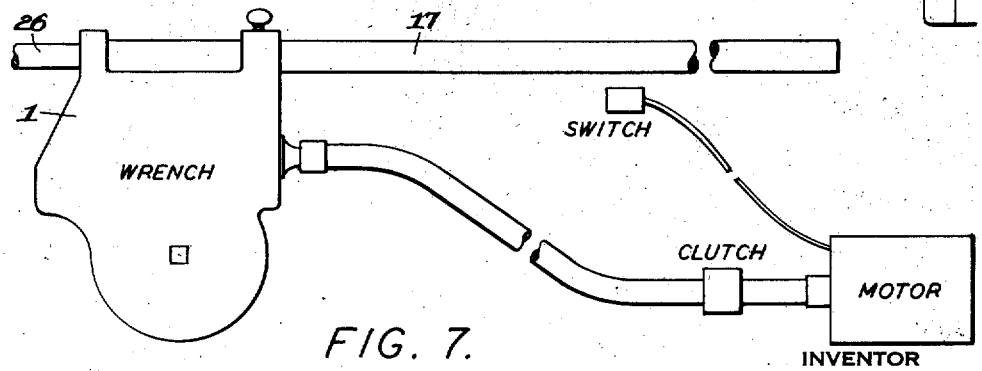
Fig. 7 is a view, largely in diagram, showing the use of a gasolene engine and flexible shaft, provided with a power control clutch and switch, as a motor for operating the wrench gearing.

To avoid loss of power in transmission to the wrench gearing, due largely to vibration of the motor, the development of torsional forces and the like, the motor, when of the electric or compressed air type, is securely and firmly clamped to the rigid handle 17 of the wrench, which, in turn, is strongly reinforced and secured at two points of support to the casing. When a gasolene motor is employed, these disturbing conditions are not present to the same extent, as the motor rests on the ground and transmission to the worm shaft is effected by a flexible shaft, as shown in Fig. 7, which is provided at an intermediate point with a suitable clutch and also with a hand-operated switch, for controlling transmission to the wrench.

Figure 4:
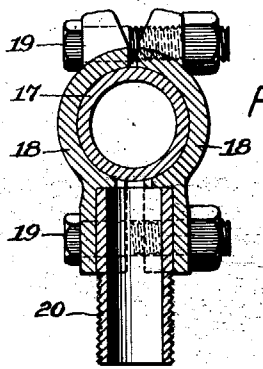
Fig. 4 is a sectional view on the line $s^4$—$s^4$ of Fig. 1, showing the detail structure of the preferred form of clamp employed to rigidly connect the wrench handle proper and the motor casing.

The preferred form of clamp used for securely anchoring the motor against independent movement, to the handle of the wrench, is shown in Figs. 1 and 4. It consists of two half sections 18, shaped, when assembled and secured together by bolts 19, to embrace both the wrench handle and the upper end of a short stud or tube 20, that is threaded at its lower end in a socket of the motor casing. This rigid connection between the motor and the wrench handle avoids the necessity of employing additional support for the motor, which is securely and firmly held by the grip of the clamp on the handle and against independent movement.

Figure 6:
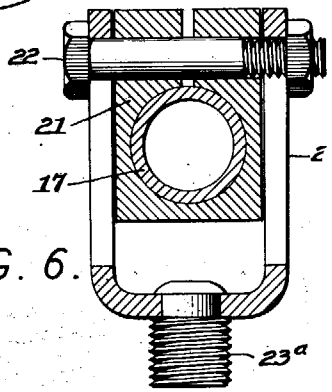
Fig. 6 is a sectional view on the line $s^6$—$s^6$ of Fig. 5.
Figure 5:
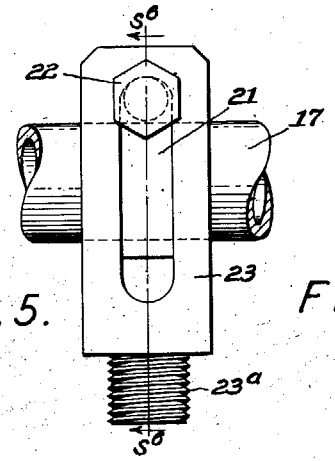
Fig. 5 is a view in elevation of a modified form of clamp.

A modified form of the clamp is shown in Figs. 5 and 6, which consists of a split apertured block 21 that is slipped on and closed about the wrench handle by a bolt 22 of a clamp member 23. The clamp member carries the block and is provided with an integral or welded lower projecting stud 23a, designed to be threaded in the motor casing.

The handle proper of the wrench is in the form of a suitable length of comparatively heavy pipe, one end of which is slipped through an opening in a stout lug 24, projecting from the gear casing, and is threaded in and through a second lug 25 of the casing, to bring the open end of the pipe handle substantially flush with the far side of the lug.

In exceptional instances, when the resistance offered by the work exceeds the mechanical power available, aided by manpower applied to the wrench handle, any tendency of the handle to bend under the strain, will be at or near the right side of the lug 24, as viewed in Fig. 1, and it is therefore desirable to reinforce, strengthen and reduce the strain on the handle at the point mentioned.

To further offset any tendency of the handle to bend under strain, it is desirable to balance the manpower applied to the wrench handle and at the same time provide for increasing such power by extending the handle in opposite directions on both sides of the gear casing, thus enabling two or four men to operate the wrench manually or resist torque when it is driven by power.

To meet the above mentioned requirements, the handle proper 17, is duplicated, in effect, on the opposite side of the gear casing, by the use of a suitable length of rod or pipe 26 of a diameter to telescope into the handle proper and be drawn out and secured only when there is occasion for its use, which arrangement avoids lengthening the wrench unnecessarily for normal operation.

The telescoping section 26 is provided with spaced apart sockets or openings 27, for engagement by a screw bolt 28, to secure the handle extension as adjusted. The screw bolt is threaded in the lug 24 of the gear casing and when screwed down to the limit of its length, passes through an opening 29 of the tubular handle 17 and on into one of the sockets or openings 27 of the telescoping section 26, when the latter is adjusted lengthwise to bring the socket or opening into registering relation for engagement by the bolt. The handle sections are thus locked together against independent turning or lengthwise movement, tending to loosen the threaded connection of the handle 17 in the lug 25 and the telescoping section 26 is similarly held in any position to which it may be adjusted.

In the use of the wrench for opening or closing subsurface valves or for other work that is not conveniently accessible and for which repeat orders may be issued from time to time, it is desirable to make a record for future comparison and guidance, of the number of turns made by the worm gear shaft to complete each job.

Figure 3:
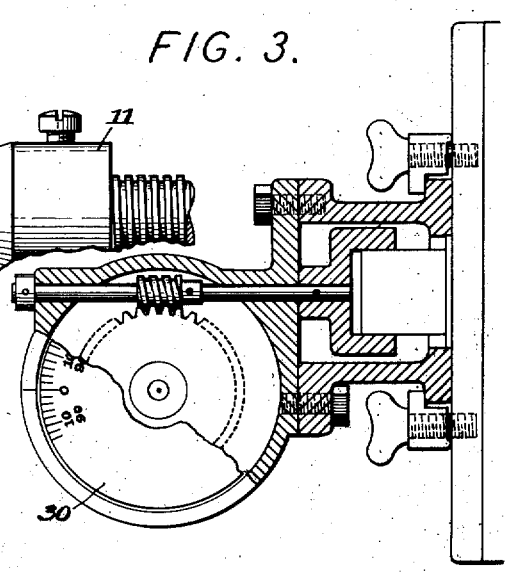
Fig. 3 is a view, partly in section, showing an attached counter for indicating the number of turns made by the wrench in each operation.

For this purpose, a conventional form of revolution counter 30 is employed, suitable for indicating the number of right or left hand turns. The counter may be detachably coupled to either free end of the worm gear shaft, opposite that connected to a tool or other work element, as shown in Fig. 3.

Any suitable form of shaft coupling may be employed and the counter is removably secured in position by being bolted to the end plate of the gear casing, as shown.

The dial of the counter is spring-held in frictional engagement with a flange of its shaft to rotate with the same in either direction and, after each operation, is designed to be reset by hand. This is accomplished by pressing the dial back against the action of the spring, until it is clear of the flange and, after turning it back to zero, releasing it for advance by the spring into frictional engagement with the flange, preparatory to the next operation.

While the uses for which the wrench is adapted, are too numerous to be described at length, it may be said generally, that its main purpose is for heavy and/or inaccessible work that is either beyond the power of man or cannot be economically and expeditiously done by man power.

I claim:

1. A portable tool optionally operative by power and/or manually for rotating a work element, comprising *suitable* [worm] gearing and a casing therefor from which the shafts of the [worm and the worm gear] *driving and the driven members of the gearing* project for coupling respectively to a source of power and to the work element to be rotated, a motor as the source of power for driving the gearing and a handle consisting of a main section and an auxiliary section for manually steadying and operating the tool, the main section of the handle being rigidly connected in non-rotatable relation to the casing and extending outward therefrom in one direction and the auxiliary section being adjustably secured relatively to the casing and optionally extendible both in the direction of the main section to increase its length and leverage as well as in the opposite direction to balance the power applied when the tool is manually operated.

2. A portable tool as defined in claim 1 in which the main section of the handle extends outward from the gear casing in a direction parallel with the [worm] shaft *of the driving member of the gearing* and is secured to the casing at two spaced-apart points, the connection at one point including threadedly engaged screw threaded portions of the casing and said main handle section and the connection at the other point including a bolt member operatively engaging the casing and said main handle section along an axis transverse to the axis of the threaded connection whereby to lock the screw threaded parts of said connection against rotative movement tending to loosen it.

3. The portable tool defined in claim 2 wherein the main and auxiliary handle sections are tubular and are telescopically disposed one within the other for adjustable extension relative to each other, and wherein said bolt member includes a portion adapted to enter an aperture provided in the inner handle section to maintain said handle sections in a desired position of telescopic adjustment.

4. The portable tool defined in claim 2 wherein a supporting connection is provided between the main handle section and the motor outwardly of the connection including said bolt member, said supporting connection being arranged to support the motor coaxially of the [worm] *driving member of the gearing.*

5. The portable tool defined in claim 2 wherein a supporting connection is provided between the main handle section and the motor outwardly of the connection including said bolt member, said supporting connection being arranged to support the motor coaxially of the [worm] *driving member of the gearing,* said supporting connection for the motor including a clamping member adjustable along the axis of said main handle member and releasable therefrom to detach the motor for use separated from the tool.

MARTIN W. BARDWELL.

REFERENCES CITED

The following references are of record in the file of this patent or the original patent:

UNITED STATES PATENTS

| Number | Name | Date |
|---|---|---|
| 970,737 | Neller | Sept. 20, 1910 |
| 1,346,716 | Lee | July 13, 1920 |
| 1,424,794 | Ayotte | Aug. 8, 1922 |
| 1,537,089 | Jimerson | May 12, 1925 |
| 1,927,383 | Bardwell | Sept. 19, 1933 |
| 1,970,179 | Miller | Aug. 14, 1934 |
| 2,153,424 | McRae | Apr. 4, 1939 |
| 2,244,446 | Clark | June 3, 1941 |
| 2,293,200 | Foote | Aug. 18, 1942 |
| 2,342,783 | Aron et al. | Feb. 29, 1944 |
| 2,429,569 | Stewart | Oct. 21, 1947 |
| 2,510,483 | Schnepel et al. | June 6, 1950 |